US 010448616B2

(12) United States Patent
Sarver

(10) Patent No.: US 10,448,616 B2
(45) Date of Patent: Oct. 22, 2019

(54) BALANCE BEAM APPARATUS FOR PET TRAINING AND FITNESS

(71) Applicant: Eco Sports Group, Inc., Indianapolis, IN (US)

(72) Inventor: John T. Sarver, Indianapolis, IN (US)

(73) Assignee: Eco Sports Group, Inc., Indianapolis, IN (US)

( * ) Notice: Subject to any disclaimer, the term of this patent is extended or adjusted under 35 U.S.C. 154(b) by 41 days.

(21) Appl. No.: 15/586,047

(22) Filed: May 3, 2017

(65) Prior Publication Data

US 2017/0231197 A1 Aug. 17, 2017

Related U.S. Application Data

(63) Continuation of application No. 15/524,170, filed as application No. PCT/US2016/037105 on Jun. 11, 2016.

(60) Provisional application No. 62/174,830, filed on Jun. 12, 2015, provisional application No. 62/218,025, filed on Sep. 14, 2015.

(51) Int. Cl.
*A01K 15/02* (2006.01)

(52) U.S. Cl.
CPC .................................. *A01K 15/027* (2013.01)

(58) Field of Classification Search
CPC .................................................... A01K 15/027
See application file for complete search history.

(56) References Cited

U.S. PATENT DOCUMENTS

| 3,653,658 A | * | 4/1972 | Robertson | ................ A63B 3/00 |
| | | | | 428/23 |
| 2007/0256893 A1 | | 11/2007 | Horn et al. | |
| 2012/0052013 A1 | * | 3/2012 | Chapman | ............. A01K 15/027 |
| | | | | 424/9.2 |
| 2012/0060765 A1 | * | 3/2012 | Hough | ................. A01K 15/027 |
| | | | | 119/706 |

(Continued)

OTHER PUBLICATIONS

Watson, Mick, "Agility Obstacle Training", archived Feb. 19, 2012, accessed Jan. 7, 2018, <http://www.cockapooclubgb.co.uk/agility-obstacle-training-step-by-step.html> (Year: 2012).*

(Continued)

*Primary Examiner* — Michael H Wang
(74) *Attorney, Agent, or Firm* — Thomas | Horstemeyer, LLP

(57) ABSTRACT

Disclosed are various embodiments for a balance beam apparatus for exercising or training pets that may include, for example, a balance beam having a first distal end, a second distal end, and a portion raised from a ground surface, the first distal end of the balance beam being positioned on a first beam base, the second distal end of the balance beam being positioned on a second beam base, where the first beam base comprises a first beam and a second beam stacked vertically to form steps leading up to the balance beam, and where the second beam base includes a third beam and a fourth beam stacked vertically to form steps leading down from the balance beam. The first beam base and the second beam base may have a width substantially similar to a width of the balance beam. The balance beam apparatus may be free-standing and portable.

20 Claims, 8 Drawing Sheets

(56) References Cited

U.S. PATENT DOCUMENTS

2014/0150188 A1 6/2014 Allen

OTHER PUBLICATIONS

Donahue, George, "Balance Beam Training", archived Oct. 11, 2011, accessed Jan. 7, 2018, <http://fightingarts.com/reading/article.php? id=652> (Year: 2011).*

Sundance, Kyra, "DIY: How to Make a Balance Beam for Your Pet from 101 Dog Tricks, Kids Edition", Jul. 1, 2014, <https://www.guartoknows.com/blog/quartohomes/2014/07/01/diy-how-to-make-a-balance-beam-for-your-pet-from-101-dog-tricks-kids-edition-by-kyra-sundance/> (Year: 2014).*

"How to: Build a Timber Wall", https://www.youtube.com/watch?v=Qdtxolo7i78, Jun. 22, 2013 (Year: 2013).*

Dog on It Parks, A-Frame: A Dog Agililty Classic, http://www.dog-on-it-parks.com/blog/frame-dog-agility-classic/ (last visited Mar. 28, 2017).

Dog on It Parks, Dog Walk Ramp, http://www.dog-on-it-parks.com/dog-walk-ramp.html (last visited Mar. 28, 2017).

Dog on It Parks, Wait Table, http://www.dog-on-it-parks.com/wait-table-8-16-high.html (last visited Mar. 28, 2017).

Dog on It Parks, Whippet Walk, http://www.dog-on-it-parks.com/whippet-walk.html (last visited Mar. 28, 2017).

Dog on It Parks, Dachshund Double Ramp, http://www.dog-on-it-parks.com/dachshund-double-ramp.html (last visited Mar. 28, 2017).

Dog on It Parks, Collie Crawl, http://www.dog-on-it-parks.com/collie-crawl.html (last visited Mar. 28, 2017).

Barkpark, Dog Walk, http://www.dogparkproduct.com/activities/dog_walk.html (last visited Mar. 28, 2017).

Barkpark, King of the Hill, http://www.dogparkproduct.com/activities/king_of_the_hill.html (last visited Mar. 28, 2017).

Agility Bits. Garden Dog Walk. Manual [online]. 2012 [retrieved on Nov. 28, 2012). Retrieved from the internet <URL: https://web.archive .org/web/20 121128035633/http://www .agilitybits.co.uk/Equipment/dogwalk2/dogwalk2.htm>.

International Search Report for PCT/US2016/037105 dated Oct. 14, 2016.

* cited by examiner

BALANCE BEAM APPARATUS FOR PET TRAINING AND FITNESS

CROSS-REFERENCE TO RELATED APPLICATIONS

This application is a continuation of, and claims priority to, co-pending U.S. patent application Ser. No. 15/524,170, filed on May 3, 2017, entitled "BRIDGE CLIMBING APPARATUS FOR PET TRAINING AND FITNESS," the 35 U.S.C. § 371 national stage application of PCT Application No. PCT/US2016/037105, filed Jun. 11, 2016, entitled "FREESTANDING PORTABLE PET TRAINING AND EXERCISE EQUIPMENT," where the PCT claims the benefit of and priority to U.S. Provisional Patent Application No. 62/174,830, filed Jun. 12, 2015, entitled "FREESTANDING PORTABLE DOG TRAINING EQUIPMENT," and U.S. Provisional Patent Application No. 62/218,025, filed Sep. 14, 2015, entitled "FREESTANDING PORTABLE DOG TRAINING EQUIPMENT," the contents of which are incorporated by reference herein in their entirety.

This application relates to U.S. patent application Ser. No. 29/557,651, filed Mar. 10, 2016, entitled "PET CLIMBING PLATFORM," U.S. patent application Ser. No. 29/557,656, filed Mar. 11, 2016, entitled "PET CLIMBING APPARATUS," and U.S. patent application Ser. No. 29/557,659, filed Mar. 10, 2016, entitled "PET HURDLES," the contents of which are incorporated by reference herein in their entirety.

BACKGROUND

Pets, such as dogs, cats, and other animals, require outdoor play, exercise, physical stimulation, and mental stimulation to be healthy. Animal parks and play areas contribute to the health and well-being of a pet by facilitating an environment where pets can play, exercise, learn, and train off their leash. However, animal parks and play areas tend to lack the equipment necessary to enable improvement to a pet's agility, balance, conditioning, and strength in its hindquarters, which is important for many pets, such as dogs, especially as they age, becoming susceptible to arthritis and hip dysplasia. Moreover, maintaining strong muscles in a pet's legs and hips helps maintain and even improve the pet's mobility. Most animal park and play area agility equipment offered today are agility products that are not "intuitive" for a pet, meaning a pet has to be coached or trained to utilize the products.

An additional problem with animal park and play area equipment is that it may require holes to be dug or concrete to be poured into the ground in order to be installed, thereby destroying grass or other terrain and requiring specialized skills and equipment for installation. Thus, there is a need for animal park and play area equipment that facilitates the development of agility, balance, conditioning, and hindquarter strength in pets, while also being used in a way that does not destroy the terrain. These features also allow the equipment to be portable in nature, allowing a park department or other user to store the equipment during the winter or re-locate the equipment to a different area to give the grass a break from all the animal park and play area traffic.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of freestanding portable pet equipment for training and exercising animals and its components is provided, followed by a discussion of various embodiments of the same. While various embodiments described herein refer to apparatuses used in the training or exercising of dogs, the freestanding portable pet equipment is not so limited and can be used in training or exercising other animals, such as cats, horses, and other pets.

Embodiments of the disclosure include various apparatuses, methods, and mechanisms directed to freestanding portable pet training and exercising equipment that can be used to create an environment where dogs and other pets can improve and develop agility, balance, and body strength. Such apparatuses, methods, and mechanisms can be employed in various ways to allow pets to play and train without the apparatuses destroying or puncturing the terrain. Such apparatuses, methods, and mechanisms can also be employed in various ways to allow for an easy assembly by an end user and also makes the product portable if, for example, a user decides to move equipment to differing locations for shade variance, turf management, seasonal weather, or other reason. In addition, the disclosed equipment is more intuitive for pets and designed to be more playful or play-related while offering improvements to balance, stability, strength, and agility conditioning. The features of the disclosed products have been designed to be easy for a pet, such as a dog, to use and also more inviting by having low profiles and less step angles and using materials that have more natural aesthetics.

Figure 1:
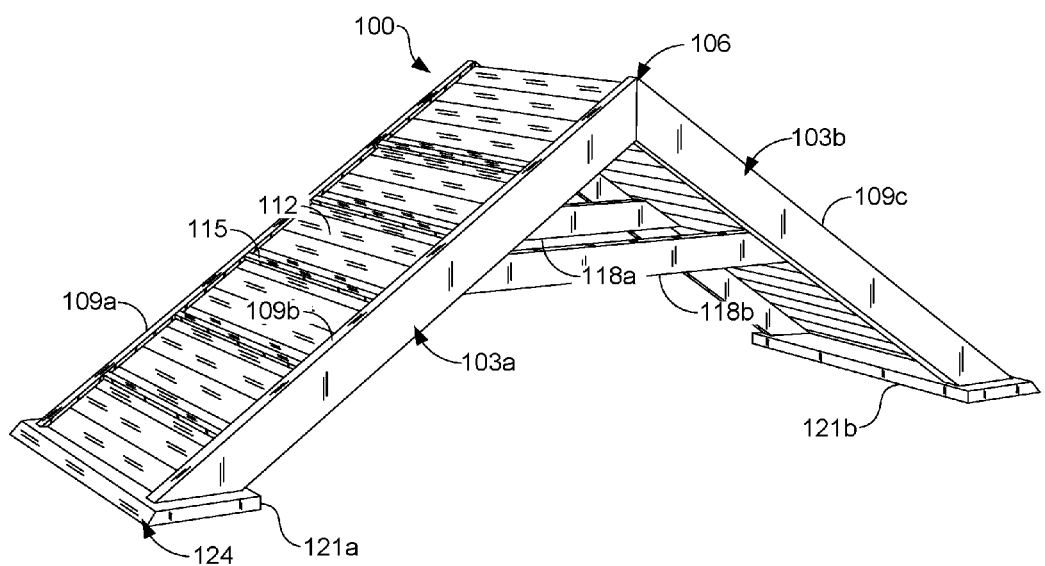
FIG. 1 shows a first embodiment of a freestanding portable pet apparatus according to various embodiments of the present disclosure.

With reference to FIG. 1, shown is a first embodiment of a freestanding portable pet apparatus 100 according to various embodiments of the present disclosure. To provide exercise to a pet, such as a dog, the freestanding portable pet apparatus 100 assumes the shape of a hill, thereby exercising muscles of a pet required to traverse an incline and navigate a decline. In some embodiments, the freestanding portable pet apparatus 100 can be symmetrical in shape.

In the example of FIG. 1, the freestanding portable pet apparatus 100 includes a first ramp 103a and a second ramp 103b (collectively "ramps 103") directly coupled at a coupling point 106, which can be located at a peak of the freestanding portable pet apparatus 100. In some embodiments, the first ramp 103a and the second ramp 103b assume an approximate incline and decline of or between 20° to 35°, respectively; however, in alternative embodiments, each ramp 103 can assume a lower or higher degree of incline as suited. The first ramp 103a and the second ramp 103b can include ramp sides 109a . . . 109c (collectively "ramp sides 109") which protrude from a surface 112 of a respective one of the ramps 103 to provide a safety rail. In some embodiments, the ramp sides 109 can be trapezoidal-shaped, whereby the ends are cut or otherwise shaped at 90° angles to allow an end of the ramp side 109a to mount flush with an opposing end of the ramp side 109c at the coupling point 106.

Further, the first ramp 103a and the second ramp 103b can include supports 115 that protrude from the surface 112 of a respective one of the ramps 103, thereby providing paw or hoof support for a pet as it navigates the ramps 103. For example, the supports 115 may protrude an inch (or other suitable dimension) from the surface 112 of a respective one of the ramps 103. In some embodiments, the supports 115 span a width of the surface 112 of a respective ones of the ramps 103 such that they are coupled to the ramp sides 109.

Beyond coupling at the coupling point 106, the first ramp 103a and the second ramp 103b can be further coupled via coupling members 118a and 118b (collectively "coupling members 118") extending horizontally between the ramps 103. Like the ramp sides 109, the coupling members 118 can assume a trapezoidal shape, having ends cut or otherwise shaped at a suitable angle to mount flush with a bottom of the first ramp 103a and the second ramp 103 while being parallel to the ground, as illustrated in FIG. 1. As can be appreciated, the coupling members 118 provide further support as weight is applied to one of the ramp sides 109 or when the freestanding portable pet apparatus 100 is moved and relocated.

Bottom ends of the ramp sides 109 (opposite to that of the coupling point 106) can be coupled to ramp feet 121a and 121b (collectively "ramp feet 121"). As some embodiments described herein include the ramp sides 109 assuming a trapezoidal shape, a top surface of the ramp feet 121 can assume a same or similar angle as a bottom end of the ramp sides 109 such that the bottom end of the ramp sides 109 mates flush with the top surface of the ramp feet 121. The ramp feet 121 can include a width wider to that of the ramp sides 109 to provide additional support and balance to the freestanding portable pet apparatus 100. Additionally, a front 124 of the ramp feet 121 can assume an angle the same as or similar to that of the ramp sides 109, for example, to prevent a pet from stumbling on the ramp feet 121.

Figure 2:
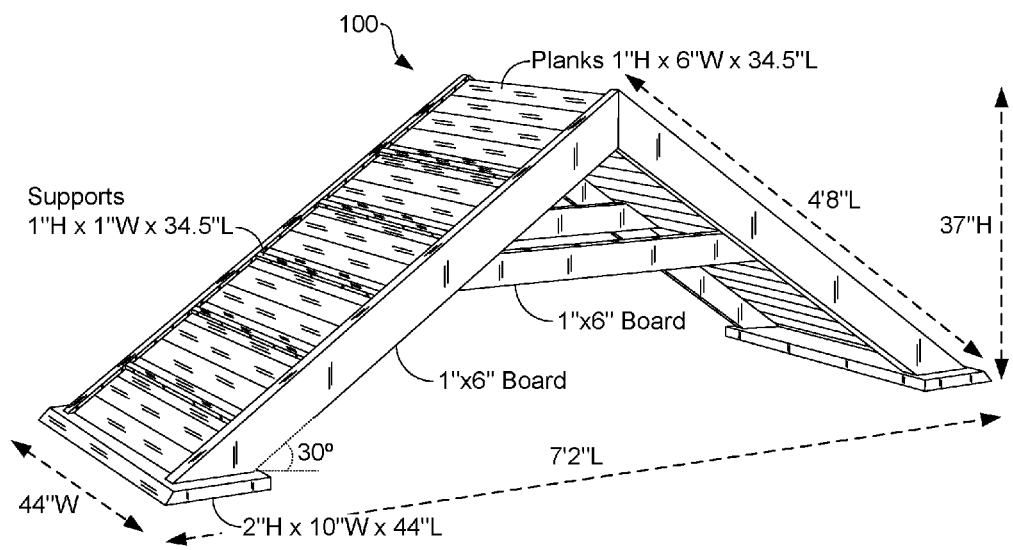
FIG. 2 shows example dimensions of the first embodiment of the freestanding portable pet apparatus of FIG. 1 according to various embodiments of the present disclosure.

Moving on to FIG. 2, example dimensions of the embodiment of the freestanding portable pet apparatus 100 of FIG. 1 are shown according to various embodiments of the present disclosure. In some embodiments, individual ones of the supports 115 can include a block with dimensions of approximately a height of one inch, a width of one inch, and a length of 34.5 inches. As can be appreciated, the supports 115 can assist pets, such as dogs, when ascending and descending on the ramps without sliding. In some embodiments, the surface 112 of the ramps 103 include wooden or plastic boards. To this end, in some embodiments, the boards can include dimensions of approximately a height of one inch, a width of 6 inches, and a length of 34.5 inches. In other embodiments, the boards can have a width of approximately 4 inches, 5.5 inches, or other suitable width.

The freestanding portable pet apparatus 100 can assume a height to width ratio that provides suitable stability without requiring affixation to the terrain using any concrete footers or other affixing mechanism. In one example, a height of the freestanding portable pet apparatus 100 is 37 inches and a length of the freestanding portable pet apparatus 100 is 7 feet and 2 inches (an approximate height to length ratio of 0.43), while the first ramp 103a and the second ramp 103b have a length of approximately 4 feet and 8 inches. The dimensions of the ramp feet 121 can include a height of 2 inches, a width of 10 inches, and a length of 44 inches. The coupling members 118 and the ramp sides 109 can be constructed from one inch by 6 inch boards or other material. In some embodiments, length of the ramps 103 can be 4 feet and 8 inches. The surface 112 of the ramps 103 can include multiple boards coupled together where each board has a height of one inch, a width of 6 inches, and a length of 34.5 inches. It should be noted that the dimensions described in FIG. 2 are merely for example purposes, and that the freestanding portable pet apparatus 100 can assume other dimensions, as suited.

Figure 3:
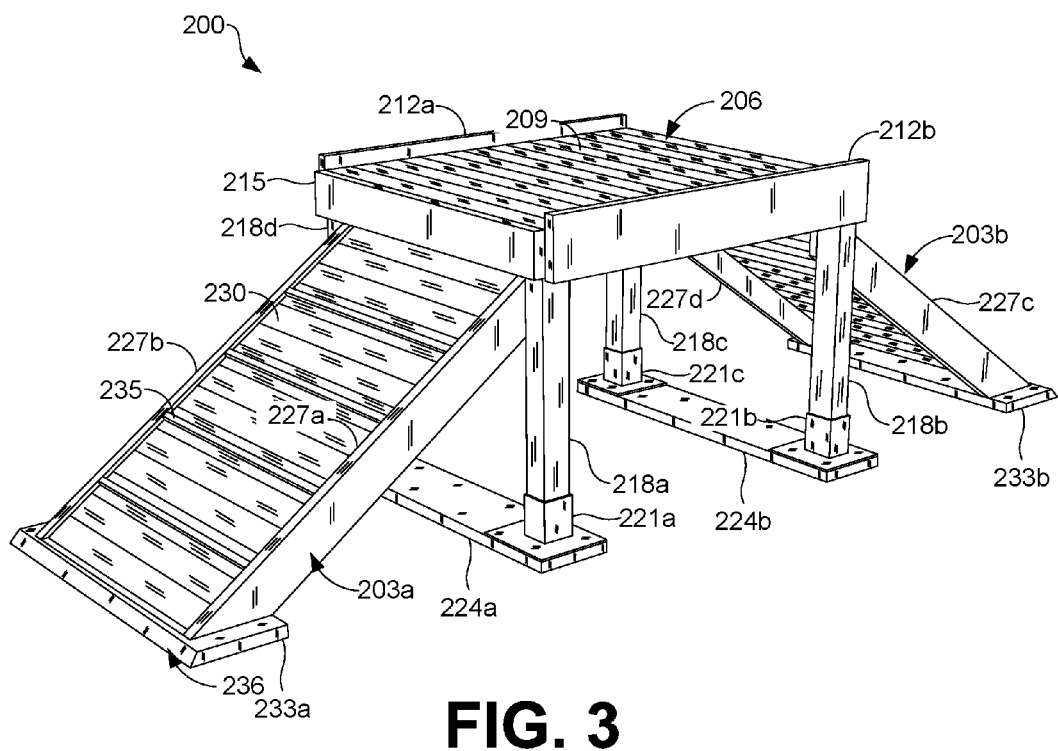
FIG. 3 shows a second embodiment of a freestanding portable pet apparatus according to various embodiments of the present disclosure.

Moving on to FIG. 3, shown is a second embodiment of a freestanding portable pet apparatus 200. In FIG. 3, the freestanding portable pet apparatus 100 is shown as having a first ramp 203a and a second ramp 203b (collectively "ramps 203"), with a platform 206 positioned between the first ramp 203a and the second ramp 203b, thereby forming a bridge or similar structure. In some embodiments, the freestanding portable pet apparatus 200 can be symmetrical in shape.

The platform 206 can include a platform surface 209, platform sides 212a and 212b (collectively "platform sides 212"), a platform front 215, and a platform back (not shown) at an opposite side of the platform 206 from the platform front 215. The platform 206 can be supported by a plurality of posts 218a . . . 218d (collectively "posts 218"). In some embodiments, the platform 206 is supported by four posts 218, although other suitable amount of posts 218 can be employed to provide load bearing stability.

The posts 218 can be positioned in post anchors 221a . . . 221c (collectively "post anchors 221") affixed to platform feet 224a and 224b (collectively "platform feet 224"). In some embodiments, the freestanding portable pet apparatus 200 can include two platform feet 224 where two posts 218 are positioned in each of the platform feet 224. The platform feet 224 can include a width that provides additional support and stability, as can be appreciated. In some embodiments, the posts 218 can be coupled directly to the platform feet 224 without using the post anchors 221.

The platform sides 212 can be configured to protrude beyond the platform surface 209 to act as a safety rail, thereby deterring a pet traversing the platform 206 from attempting to leave the platform surface 209 from one of the platform sides 212. The top of the platform front 215 and the platform back (not shown) can be flush with the platform surface 209.

The first ramp 203a and the second ramp 203b can assume an incline in the range of 20° to 35°, respectively; however, in alternative embodiments, each ramp 203 can assume a lower or higher degree of incline or decline as suited. The first ramp 203a and the second ramp 203b can include ramp sides 227a . . . 227d (collectively "ramp sides 227") which protrude from a ramp surface 230 of a respective one of the ramps 203. In some embodiments, the ramp sides 227 can assume a trapezoidal shape where the ends are cut or otherwise shaped at 90° angles.

Bottom ends of the ramp sides 227 (opposite to that of the plafform 206) can be coupled to ramp feet 233a and 233b (collectively "ramp feet 233"). As some embodiments described herein include the ramp sides 227 assuming a trapezoidal shape, a top surface of the ramp feet 233 can assume a same or similar angle as a bottom end of the ramp sides 227 such that the bottom end of the ramp sides 227 mates flush with the top surface of the ramp feet 233. The ramp feet 233 can include a width wider to that of the ramp sides 227 to provide additional support and balance to the freestanding portable pet apparatus 200. Additionally, a front 236 of the ramp feet 233 can assume an angle the same as or similar to that of the ramp sides 227, for example, to prevent a pet from stumbling on the ramp feet 233. In some embodiments, a beam or other load bearing device (not shown), such as a 2×4, can be positioned on a bottom side of the ramp 203 parallel to and centered between the ramp sides 227, while spanning a length of the ramp 203. This load bearing device can provide additional support and stability for the ramps 203, as can be appreciated.

Further, the first ramp 203a and the second ramp 203b can include supports 235 that protrude from the ramp surface 230 of a respective one of the ramps 203, thereby providing paw or hoof support for a pet as it navigates the ramps 203. In some embodiments, the supports 235 assume a width of the surface 112 of a respective ones of the ramps 203 such that they can be coupled to the ramp sides 227.

In various embodiments, some or all of the components of the freestanding portable pet apparatus 200 described above can be constructed of recycled plastic, such as high-density polyethylene. In other embodiments, the components can be constructed of natural weather-resistant cedar or pressure-treated lumber. To this end, in various embodiments, the freestanding portable pet apparatus 200 can be positioned on a terrain without the use of concrete footers or any other permanent affixing mechanism, while remaining stable enough to withstand a load and movement of a pet without the apparatus moving or toppling over.

Figure 4:
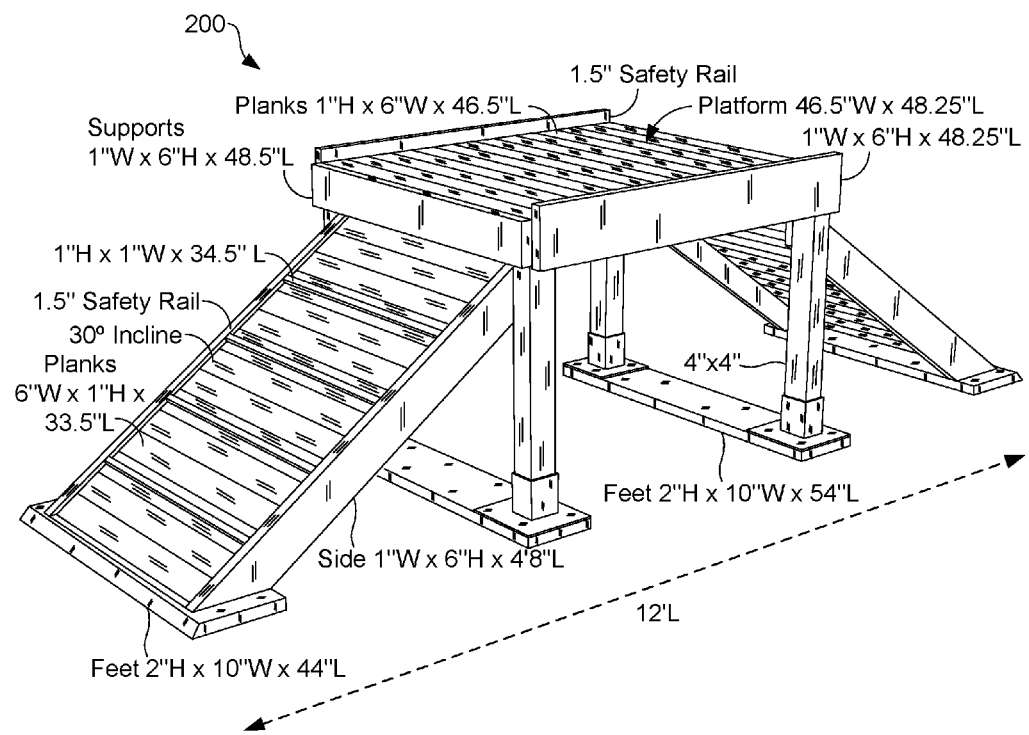
FIG. 4 shows example dimensions of the second embodiment of the freestanding portable pet apparatus of FIG. 3 according to various embodiments of the present disclosure.

Moving on to FIG. 4, example dimensions of the embodiment of the freestanding portable pet apparatus 200 of FIG. 3 are shown according to various embodiments of the present disclosure. In some embodiments, individual ones of the posts 218 can be 4 inches×4 inches. The platform sides 212 can have a width of approximately one inch, a height of approximately six inches, and a length of approximately 48.24 inches. The platform sides 212 can be situated in association with the platform surface 209 to create a safety rail of approximately 1.5 inches. The platform surface 209 can have a width of 46.5 inches and a length of 48.25 inches. The platform surface 209 can be made of a plurality of planks having a height of one inch, a width of 6 inches, and a length of 46.5 inches. The platform front 215 and the platform back (not shown) can have a width of one inch, a height of 6 inches, and a length of 48.5 inches.

The supports 235 can have a height of one inch, a width of one inch, and a length of 34.5 inches. The ramp sides 227 can have a width of one inch, a height of 6 inches, and a length of 4 feet and 8 inches. The ramp sides 227 can be positioned in association with the ramp surface 230 such that a 1.5 inch safety rail is formed on the ramp 203. The ramp feet 233 can have a height of 2 inches, a width of 10 inches, and a length of 44 inches. In addition, the front 236 of the ramp feet 233 can have a slope or incline substantially similar to a corresponding one of the ramps 203. In some embodiments, the ramps 203 can have a 30° incline. The ramp surface 230 can be made up of a plurality of planks having a width of 6 inches, a height of one inch, and a length of 33.5 inches. An overall length of the freestanding portable pet apparatus 200 can be 12 feet. It should be noted that the dimensions described in FIG. 4 are merely for example purposes, and that the freestanding portable pet apparatus 200 can assume other dimensions, as suited.

Figure 5:
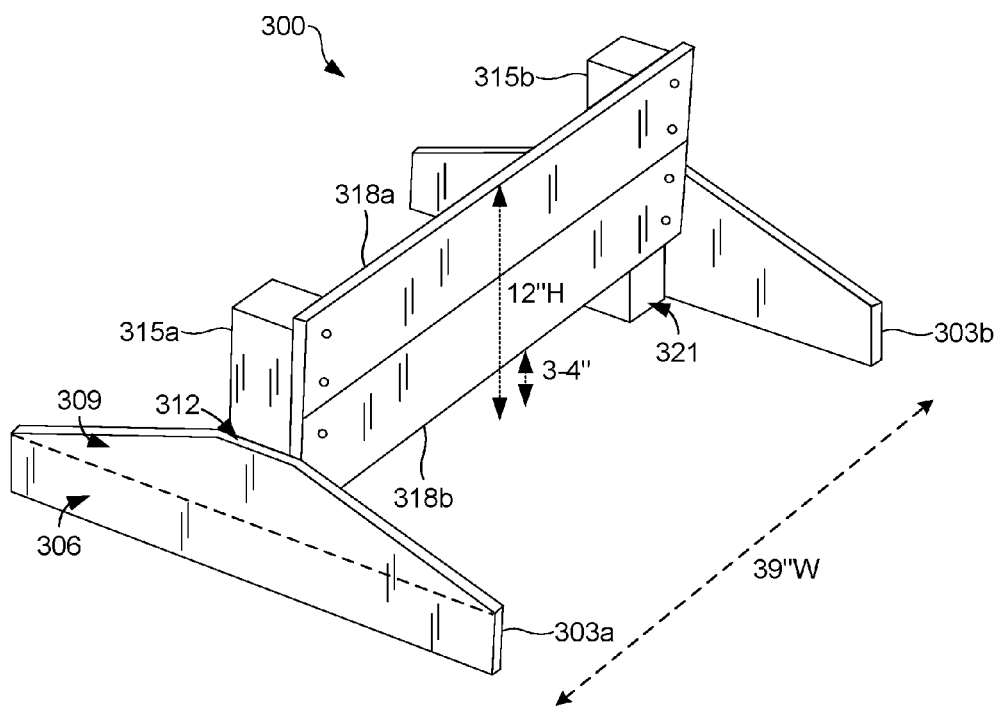
FIGS. 5-7 show examples of a third embodiment of a freestanding portable pet apparatus according to various embodiments of the present disclosure.

Moving on to FIG. 5, a third embodiment of a freestanding portable pet apparatus 300 is shown. In FIG. 5, the freestanding portable pet apparatus 300 forms a hurdle, allowing a pet, such as a dog, to obtain physical activity by jumping over the hurdle. To this end, the freestanding portable pet apparatus 300 can include a first hurdle base 303a and a second hurdle base 303b (collectively "hurdle bases 303"). In some embodiments, a lower portion 306 of the hurdle bases 303 are rectangular in shape whereas an upper portion 309 of the hurdle bases 303 are triangular, trapezoidal, or rhombular (resembling a rhombus) in shape. In embodiments where the upper portion 309 of the hurdle bases 303 are rhombular, the top of the rhombular shape in the upper portion 309 can include a flat portion 312 located a top of the hurdle bases 303, as shown in FIG. 5.

A first hurdle post 315a can be coupled to directly an interior of the first hurdle base 303a while a second hurdle post 315b can be coupled directly to an interior of the second hurdle base 303b. In some embodiments, a width of the hurdle posts 315 can be substantially similar to a width to the flat portion 312 of the hurdle base 303. One or more boards 318a and 318b (collectively boards 318) can be coupled to the hurdle posts 315 while retaining an exposed lower portion 321 of the hurdle posts 315. In some embodiments, the boards 318 can be positioned to protrude above a top of the hurdle posts 315, while, in other embodiments, the boards 318 can be positioned to be flush with a top of the hurdle posts 315.

Further, the hurdle posts 315 can be positioned at a distal end of the boards 318 such that a side of the hurdle posts 315 and the boards 318 are flush with an interior side of the hurdle base 303. In some embodiments, a height of the freestanding portable pet apparatus 300 having two boards 318 can include approximately 12 inches, or other suitable height, while a width of the freestanding portable pet apparatus 300 is approximately 39 inches (e.g., height to width ratio of approximately 0.31).

Figure 6:
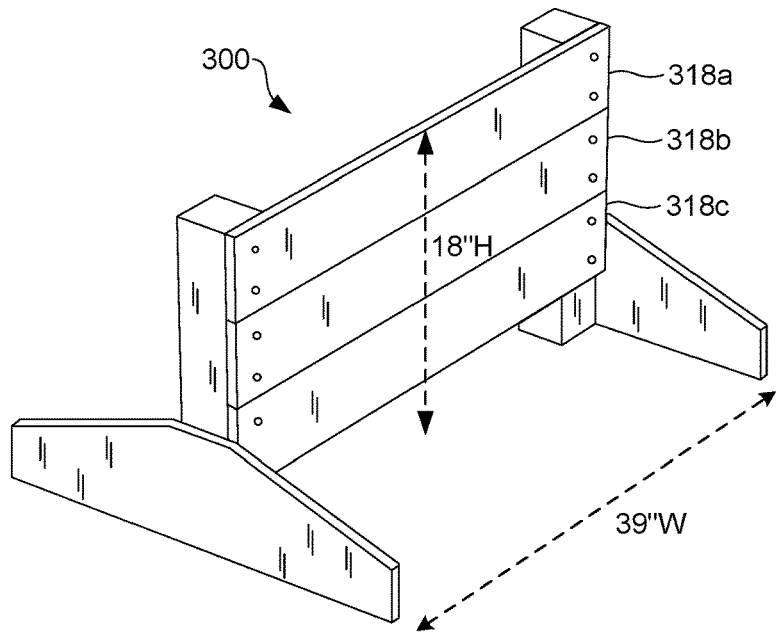
Figure 7:
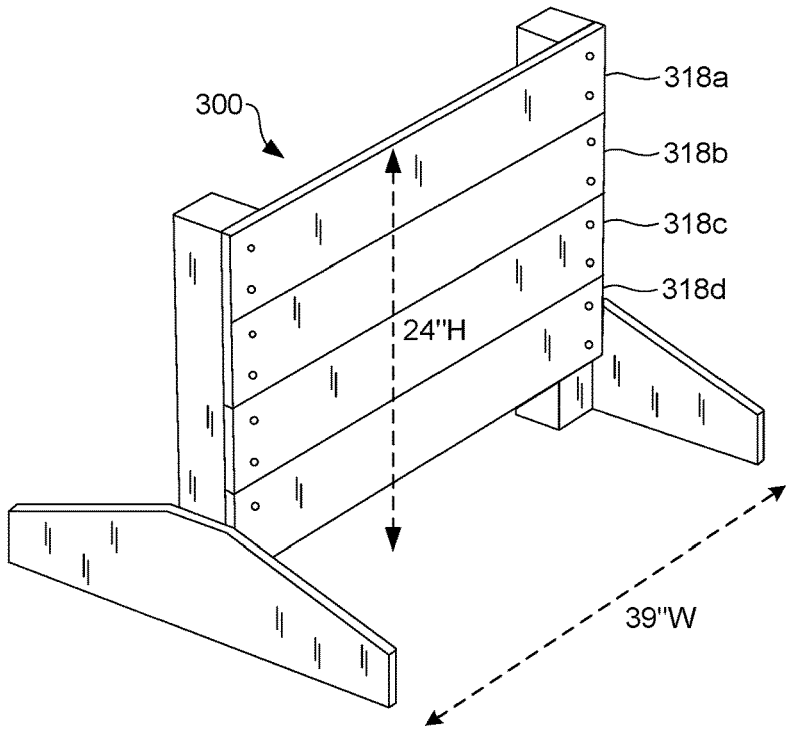

Another embodiment of the freestanding portable pet apparatus 300 having three boards 318a . . . 318c is shown in FIG. 6. In this example, a height of the freestanding portable pet apparatus 300 having three boards 318 can include approximately 18 inches, or other suitable height, while a width of the freestanding portable pet apparatus 300 is approximately 39 inches (e.g., height to width ratio of approximately 0.46). In FIG. 7, another embodiment of the freestanding portable pet apparatus 300 having four boards 318a . . . 318d is shown. In this example, a height of the freestanding portable pet apparatus 300 having four boards 318 can include approximately 24 inches, or other suitable height, while a width of the freestanding portable pet apparatus 300 is approximately 39 inches (e.g., height to width ratio of approximately 0.62). In some embodiments, a gap of approximately three to four inches, or other suitable dimension, is provided between a bottom of the boards 318 and the ground. In various embodiments, the freestanding portable pet apparatuses 300 of FIGS. 5-7 can be aligned in an order of increasing height or decreasing height, although other arrangements can be employed.

Figure 8:
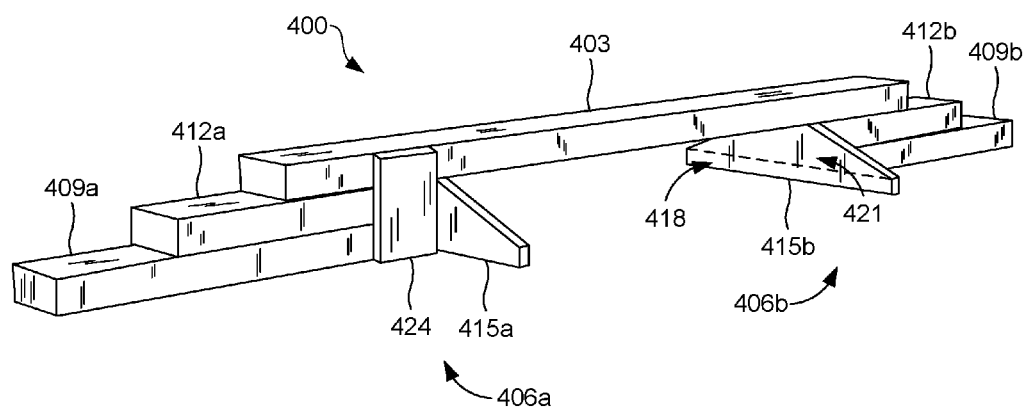
FIG. 8 shows a fourth embodiment of a freestanding portable pet apparatus according to various embodiments of the present disclosure.

Moving on to FIG. 8, shown is a fourth embodiment of a freestanding portable pet apparatus 400. In FIG. 8, the freestanding portable pet apparatus 400 can include a balance beam 403 for pets to navigate for training, exercise, or other physical activity. The balance beam 403 can be supported by a first beam base 406a and a second beam base 406b (collectively "beam bases 406"). The freestanding portable pet apparatus 400 can be symmetrical in some embodiments. The beam bases 406 can include, for example, a first step 409a and 409b, a second step 412a and 412b, and a horizontal support 415a and 415b perpendicular to a position of the balance beam 403. The first steps 409 can include an elongated structure disposed below the second steps 412, while the second steps 412 are disposed below the balance beam 403.

Similar to the hurdle base 303 described above with respect to FIG. 5, the horizontal supports 415 can be described as having a lower region 418 and an upper region 421. The lower region 418 can be substantially rectangular in shape while the upper region can be trapezoidal or rhombular in shape. As shown in FIG. 8, a top flat portion of the upper regions 421 of the horizontal supports 415 can assume a width substantially similar to that of the balance beam 403, while the upper region 421 and the lower region 418 extend outwards from the top flat portion, creating additional support and stability for the balance beam 403.

In some embodiments, the freestanding portable pet apparatus 400 can include a tie post 424 which couples the first step 409, the second step 412, the balance beam 403, and the horizontal support 415. In some embodiments, the tie post 424 is a height substantially similar to that of a top of the balance beam 403 such that the tie post 424 is flush with a top of the balance beam 403. Additionally, the tie post 424 can be positioned at an interior distal end of the beam base 406 to mount flush with a corner generated by the horizontal support 415.

Figure 9:
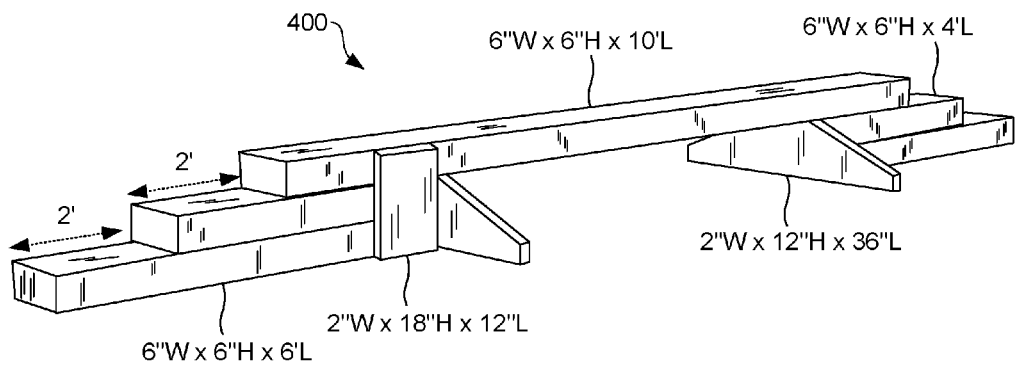
FIG. 9 shows example dimensions of the first embodiment of the freestanding portable pet apparatus of FIG. 8 according to various embodiments of the present disclosure.

Moving on to FIG. 9, example dimensions of the embodiment of the freestanding portable pet apparatus 400 of FIG. 8 are shown according to various embodiments of the present disclosure. In some embodiments, the balance beam 403 can have a width of 6 inches, a height of 6 inches, and a length of 10 feet. The first step 409 can have a width of 6 inches, a height of 6 inches, and a length of 6 feet. Disposed on the first step 409, the second step 412 can have a width of 6 inches, a height of 6 inches, and a length of 5 feet. When the first step 409 and the second step 412 are coupled at an interior distal end to the horizontal support 415, two two-foot steps are formed, with a third step being the balance beam 403. The tie post 424 can include a width of 2 inches, a height of 18 inches (or other height substantially similar to the overall height of the freestanding portable pet apparatus 400), and a length of 12 inches. The horizontal supports can include a width of 2 inches, a height of 12 inches, and a length of 36 inches. A top of the horizontal supports 415 can be substantially similar to a width of the balance beam 403. It should be noted that the dimensions described in FIG. 9 are merely for example purposes, and that the freestanding portable pet apparatus 400 can assume other dimensions, as suited.

In various embodiments, the components of the freestanding portable pet apparatuses 100, 200, 300, and 400 described herein can be constructed of recycled plastic, such as high-density polyethylene. In other embodiments, the components can be constructed of natural weather-resistant cedar or pressure-treated lumber. To this end, in various embodiments, the freestanding portable pet apparatuses 100, 200, 300, and 400 can be positioned on a terrain without the use of concrete footers or any other permanent affixing mechanism, while remaining stable enough to withstand a load and movement of a pet without the apparatus moving or toppling over.

Recycled plastic can include, for example, high-density polyethylene or another suitable material capable of bearing loads of one or more animals (plus a safety factor). The recycled plastic may also include fiberglass elements to reinforce the high density polyethylene. The recycled plastic can be treated by an extrusion process, which causes the recycled plastic to become textured and more-easily gripped. Therefore, pets can be able to move easier on the textured recycled plastic of the freestanding portable pet apparatus 200.

According to various embodiments, the recycled plastic can include ultraviolet additives to prevent deterioration when the recycled plastic is exposed to ultraviolet light. The recycled plastic can include a rot-resistant material and a splinter-free material. The recycled plastic can be resistant to marine borers, termites, fungus, salt and oils. The recycled plastic can also absorb up to approximately 6% moisture by weight. The recycled plastic can include a static dry coefficient of friction in the range of 0.3-0.6, a static wet coefficient of friction in the range of 0.3-0.6, a sliding dry coefficient of friction in the range of 0.2-0.3, and/or a sliding wet coefficient of friction in the range of 0.4-0.6.

As previously discussed, the various components described herein can include for example, boards or blocks made of cedar wood or another type of pressure-treated lumber. Cedar wood can be employed and particularly effective because of dogs' preference of its natural smell. A stain can be employed on the natural wood as cedar wood contains UV inhibitors, which can help preserve the wood and stain colorant. For example, the stain can include a 100% acrylic formula.

The components described herein can be coupled using glue, nails, screws, bolts, nuts, washers, and/or other suitable coupling mechanisms. To increase portability of the various apparatuses described herein, in some embodiments, screws are used to facilitate coupling and decoupling various components.

Figure 10:
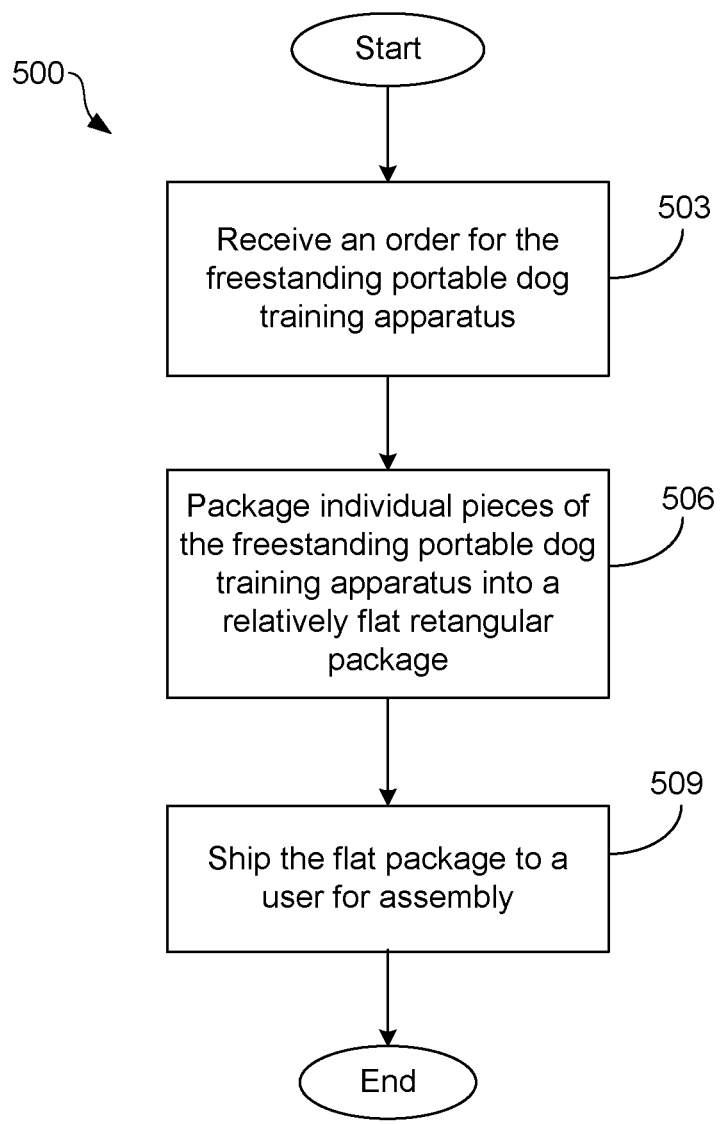
FIG. 10 is a flowchart illustrating an example of a method of providing the freestanding portable pet apparatus to an end user according to various embodiments of the present disclosure.

With reference to FIG. 10, shown is a flowchart 500 illustrating one example of a method of providing the freestanding portable pet apparatuses 100, 200, 300, and 400 to an end user according to various embodiments of the present disclosure. Beginning with box 503, an order is received for at least one of the freestanding portable pet apparatuses 100, 200, 300, and 400. The order can include a customized selection of the freestanding portable pet apparatuses 100, 200, 300, and 400. For example, the order may specify certain colors, designs, or examples. The order can be received for example, through an electronic commerce website, over the phone, or through any other suitable means. Next, in box 506, the individual pieces and components of the freestanding portable pet apparatuses 100, 200, 300, and 400 that were ordered are packaged into a relatively flat rectangular package to be sent to a user. The individual pieces can be assembled by a user without damaging a terrain that in which any piece of the freestanding portable pet apparatuses 100, 200, 300, and 400 comes into contact. For example, the user may use bolts to affix individual pieces together. Finally, at box 509, the package is sent to the user for assembly. The user can be for example, a retail consumer, a distributor, or a commercial end-user.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Clause 1: A freestanding and portable pet apparatus for exercising or training pets, comprising: a first ramp coupled to a second ramp at a coupling point forming a symmetrical structure, wherein the first ramp and the second ramp have a same angle of incline; and a plurality of connecting members horizontally disposed between the first ramp and the second ramp.

Clause 2: The freestanding and portable pet apparatus of clause 1, wherein the first ramp, the second ramp, or the plurality of connecting members comprise recycled plastic, high-density polyethylene, natural wood, cedar, or a combination thereof.

Clause 3: The freestanding and portable pet apparatus of clause 1, wherein the first ramp and the second ramp comprise a plurality of supports projecting from a surface of the first ramp and the second ramp to facilitate walking on the first ramp and the second ramp.

Clause 4: The freestanding and portable pet apparatus of clause 1, further comprising a first ramp foot coupled to the first ramp and a second ramp foot coupled to the second ramp, the first ramp foot being wider than the first ramp and comprising a front having an incline substantially similar to the first ramp, the second ramp foot being wider than the second ramp and comprising a front having an incline substantially similar to the second ramp.

Clause 5: The freestanding and portable pet apparatus of clause 1, wherein the first ramp comprises a plurality of first ramp sides substantially trapezoidal in shape, and the second ramp comprises a plurality of second ramp sides substantially trapezoidal in shape, the plurality of first ramp sides projecting above a surface of the first ramp to form a plurality of first safety rails and the plurality of second ramp sides projecting above a surface of the second ramp to form a plurality of second safety rails.

Clause 6: A freestanding and portable pet apparatus for exercising or training pets, comprising: a platform disposed between a first ramp and a second ramp, wherein the first ramp and the second ramp have a same angle of incline; a plurality of posts coupled to a bottom of the platform being configured to support the platform; and wherein the first ramp and the second ramp comprise a plurality of supports projecting from a surface of the first ramp and the second ramp to facilitate walking on the first ramp and the second ramp.

Clause 7: The freestanding and portable pet apparatus of clause 6, further comprising a plurality of platform feet coupled to the plurality of posts.

Clause 8: The freestanding and portable pet apparatus of clause 7, wherein the first ramp, the second ramp, the platform, the plurality of posts, or the plurality of feet comprise recycled plastic, high-density polyethylene, natural wood, cedar, or a combination thereof.

Clause 9: The freestanding and portable pet apparatus of clause 6, wherein the first ramp comprises a plurality of first ramp sides substantially trapezoidal in shape, and the second ramp comprises a plurality of second ramp sides substantially trapezoidal in shape, the plurality of first ramp sides projecting above a surface of the first ramp to form a plurality of first safety rails and the plurality of second ramp sides projecting above a surface of the second ramp to form a plurality of second safety rails.

Clause 10: A freestanding and portable pet apparatus for exercising or training pets, comprising: a plurality of hurdle posts disposed between a first hurdle base and a second hurdle base; at least one board coupled to the plurality of hurdle posts at each distal end of the at least one board; and wherein a lower portion of each of the first hurdle base is substantially rectangular in shape; and wherein an upper portion of each of the second hurdle base is substantially rhombular in shape.

Clause 11: The freestanding and portable pet apparatus of clause 10, wherein the at least one board is coupled to the plurality of hurdle posts such that a space of approximately three to four inches is provided between a bottom of the at least one board and a surface on which the freestanding and portable pet apparatus rests.

Clause 12: The freestanding and portable pet apparatus of clause 10, wherein the at least one board is coupled to the plurality of hurdle posts such that an exposed lower portion of the hurdle posts is visible.

Clause 13: The freestanding and portable pet apparatus of clause 10, wherein the at least one board is coupled to the plurality of hurdle posts such that a top of the at least one board protrudes above a top of the plurality of hurdle posts.

Clause 14: The freestanding and portable pet apparatus of clause 10, wherein the plurality of hurdle posts and the at least one board comprise recycled plastic, high-density polyethylene, natural wood, cedar, or a combination thereof.

Clause 15: The freestanding and portable pet apparatus of clause 10, wherein the at least one board comprises two boards.

Clause 16: The freestanding and portable pet apparatus of clause 10, wherein the at least one board comprises three boards.

Clause 17: The freestanding and portable pet apparatus of clause 10, wherein the at least one board comprises four boards.

Clause 18: A freestanding and portable pet apparatus for exercising or training pets, comprising: a balance beam situated on a top of a plurality of horizontal supports, wherein the plurality of horizontal supports are perpendicular to the balance beam; and a plurality of steps disposed below the balance beam coupled to the balance beam by at least one tie post.

Clause 19: The freestanding and portable pet apparatus of clause 18, wherein the balance beam and the plurality of steps comprise recycled plastic, high-density polyethylene, natural wood, cedar, or a combination thereof.

Clause 20: A method of providing a freestanding and portable pet apparatus comprising: receiving an order for the freestanding and portable pet apparatus, the order comprising a customized selection of the freestanding and portable pet apparatus; packaging individual pieces of the freestanding and portable pet apparatus into a flat package, whereby the individual pieces of the freestanding and portable pet apparatus are configured to be assembled by a user without damaging a terrain; and shipping the flat package to the user.

Therefore, the following is claimed:
1. A balance beam apparatus for exercising or training pets, comprising:
 a balance beam having a first distal end, a second distal end, and a medial portion between the first distal end and the second distal end, the balance beam being raised from a ground surface, the first distal end of the balance beam being positioned on a first beam base, the second distal end of the balance beam being positioned on a second beam base;

a first horizontal support positioned adjacent and perpendicular to the first beam base configured to support the first distal end of the balance beam, the first horizontal support having a lower region that is substantially rectangular in shape and an upper region substantially trapezoidal in shape;

a second horizontal support positioned adjacent and perpendicular to the second beam base configured to support the second distal end of the balance beam, the second horizontal support having a lower region that is substantially rectangular in shape and an upper region substantially trapezoidal in shape;

wherein the first beam base comprises a first beam and a second beam stacked vertically to form a plurality steps leading up to the first distal end of the balance beam, the first beam and the second beam having a width substantially similar to a width of the balance beam, the first beam and the second beam having different lengths;

wherein the second beam base comprises a third beam and a fourth beam stacked vertically to form a plurality steps leading down from the second distal end of the balance beam, the third beam and the fourth beam having a width substantially similar to the width of the balance beam, the third beam and the fourth beam having different lengths;

wherein the medial portion is not supported by additional beams such that an opening is formed between the first beam base and the second beam base; and wherein the balance beam apparatus is symmetrical, free-standing, and portable.

2. The balance beam apparatus of claim 1, wherein:
the first horizontal support is positioned perpendicular to a direction running from the first distal end to the second distal end of the balance beam;
the second horizontal support is positioned perpendicular to the balance beam; and
the first horizontal support is positioned parallel to the second horizontal support.

3. The balance beam apparatus of claim 1, wherein:
the first distal end of the balance beam is positioned on a flat top portion formed by the upper region of the first horizontal support; and
the second distal end of the balance beam is positioned on a flat top portion formed by the upper region of the second horizontal support.

4. The balance beam apparatus of claim 3, wherein:
the top flat portion of the first horizontal support has a width substantially similar to a width of the balance beam; and
the top flat portion of the second horizontal support has a width substantially similar to the width of the balance beam.

5. The balance beam apparatus of claim 4, wherein:
the upper region or the lower region of the first horizontal support extends outward from the top flat portion of the first horizontal support; and
the upper region or the lower region of the second horizontal support extends outward from the top flat portion of the second horizontal support.

6. The balance beam apparatus of claim 5, further comprising a tie post configured to couple the first beam, the second beam, the balance beam, and the horizontal support.

7. The balance beam apparatus of claim 6, wherein the tie post has a height substantially similar to that of a height of a top of the balance beam such that the tie post is flush with the top of the balance beam.

8. The balance beam apparatus of claim 7, wherein the tie post is positioned at an interior distal end of the first beam base, the tie post being configured to mount flush with a corner provided by the first horizontal support.

9. The balance beam apparatus of claim 8, wherein the balance beam, the first beam base, the second beam base, the first horizontal support, the second horizontal support, and the tie post are formed of recycled plastic, high-density polyethylene, natural wood, cedar, or a combination thereof.

10. The balance beam apparatus of claim 1, wherein:
the first beam and the second beam in the first beam base have a width substantially similar to a width of the balance beam; and
the third beam and the fourth beam in the second beam base have a width substantially similar to the width of the balance beam.

11. The balance beam apparatus of claim 1, wherein a top of the balance beam is positioned approximately 18 inches from the ground surface.

12. A system for exercising or training pets, comprising:
a balance beam apparatus, comprising:
a balance beam having a first distal end, a second distal end, and a medial portion between the first distal end and the second distal end, the balance beam being raised from a ground surface, the first distal end of the balance beam being positioned on a first beam base, the second distal end of the balance beam being positioned on a second beam base;
wherein the first beam base comprises a first beam and a second beam stacked vertically to form a plurality steps leading up to the first distal end of the balance beam, the first beam and the second beam in the first beam base having a width substantially similar to a width of the balance beam, the first beam and the second beam having different lengths; and
wherein the second beam base comprises a third beam and a fourth beam stacked vertically to form a plurality steps leading down from the second distal end of the balance beam, the third beam and the fourth beam in the second beam base having a width substantially similar to the width of the balance beam, the third beam and the fourth beam having different lengths; and
wherein the medial portion is nor supported by additional beams such that an opening is formed between the first beam and the second beam base.

13. The system of claim 12, wherein the balance beam apparatus further comprises:
a first horizontal support positioned adjacent the first beam base configured to support the first distal end of the balance beam; and
a second horizontal support positioned adjacent the second beam base configured to support the first distal end of the balance beam.

14. The system of claim 13, wherein:
the first horizontal support has an upper region and a lower region and is positioned perpendicular to the balance beam;
the second horizontal support has an upper region and a lower region and is positioned perpendicular to the balance beam; and
the first horizontal support is positioned parallel to the second horizontal support.

15. The system of claim 14, wherein:
the lower region of the first horizontal support and the lower region of the second horizontal support are substantially rectangular in shape;
the upper region of the first horizontal support and the upper region of the second horizontal support are substantially trapezoidal in shape;
the first distal end of the balance beam is positioned on a flat top portion formed by the upper region of the first horizontal support, the top flat portion of the first horizontal support having a width substantially similar to the width of the balance beam; and
the second distal end of the balance beam is positioned on a flat top portion formed by the upper region of the second horizontal support, the top flat portion of the second horizontal support having a width substantially similar to the width of the balance beam.

16. The system of claim 15, wherein the balance beam apparatus further comprises a tie post configured to couple the first beam, the second beam, the balance beam, and the first horizontal support, wherein the tie post has a height substantially similar to that of a height of a top of the balance beam such that the tie post is flush with the top of the balance beam, the tie post being positioned at an interior distal end of the first beam base, the tie post being configured to mount flush with a corner provided by the first horizontal support.

17. The system of claim 12, wherein the balance beam is freestanding and portable.

18. A method, comprising:
providing a balance beam apparatus for exercising or training pets, wherein the balance beam apparatus comprises:
a balance beam having a first distal end, a second distal end, and a medial portion between the first distal end and the second distal end, the balance beam raised from a ground surface, the first distal end of the balance beam being positioned on a first beam base, the second distal end of the balance beam being positioned on a second beam base;
a first horizontal support positioned adjacent and perpendicular to the first beam base configured to support the first distal end of the balance beam, the first horizontal support having a lower region that is substantially rectangular in shape and an upper region substantially trapezoidal in shape;
a second horizontal support positioned adjacent and perpendicular to the second beam base configured to support the second distal end of the balance beam, the second horizontal support having a lower region that is substantially rectangular in shape and an upper region substantially trapezoidal in shape;
wherein the first beam base comprises a first beam and a second beam stacked vertically to form a plurality steps leading up to the first distal end of the balance beam, the first beam and the second beam in the first beam base having a width substantially similar to a width of the balance beam; and
wherein the second beam base comprises a third beam and a fourth beam stacked vertically to form a plurality steps leading down from the second distal end of the balance beam, the third beam and the fourth beam in the second beam base having a width substantially similar to the width of the balance beam; and
wherein the medial portion is nor supported by the additional beams such that an opening is formed between the first beam base and the second beam base.

19. The method of claim 18, wherein:
the first distal end of the balance beam is positioned on a flat top portion formed by the upper region of the first horizontal support; and
the second distal end of the balance beam is positioned on a flat top portion formed by the upper region of the second horizontal support.

20. The method of claim 19, wherein:
the top flat portion of the first horizontal support has a width substantially similar to a width of the balance beam; and
the top flat portion of the second horizontal support has a width substantially similar to the width of the balance beam.

* * * * *